United States Patent
Fujitani

(10) Patent No.: US 8,231,717 B2
(45) Date of Patent: Jul. 31, 2012

(54) APPARATUS AND METHOD FOR PURIFYING OXIDIZING GAS IN A FUEL CELL

(75) Inventor: Hiroshi Fujitani, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 521 days.

(21) Appl. No.: 12/223,799

(22) PCT Filed: Mar. 1, 2007

(86) PCT No.: PCT/IB2007/000497
§ 371 (c)(1),
(2), (4) Date: Aug. 8, 2008

(87) PCT Pub. No.: WO2007/102063
PCT Pub. Date: Sep. 13, 2007

(65) Prior Publication Data
US 2010/0154629 A1    Jun. 24, 2010

(30) Foreign Application Priority Data
Mar. 8, 2006    (JP) .................................. 2006-062517

(51) Int. Cl.
*B01D 53/02* (2006.01)
(52) U.S. Cl. ................. 96/112; 96/113; 96/128; 96/143; 96/116; 429/400
(58) Field of Classification Search ............... 95/15, 18, 95/21, 90, 148, 106; 96/112, 128, 143; 429/400
See application file for complete search history.

(56) References Cited

U.S. PATENT DOCUMENTS

| | | | |
|---|---|---|---|
| 4,595,642 A | | 6/1986 | Nakanishi et al. |
| 5,925,476 A | * | 7/1999 | Kawatsu ....................... 429/424 |
| 6,815,106 B1 | * | 11/2004 | Salvador et al. ............... 429/427 |
| 7,037,360 B2 | * | 5/2006 | Inagaki et al. .................. 96/126 |
| 7,306,822 B2 | * | 12/2007 | Yadav et al. ..................... 427/79 |

(Continued)

FOREIGN PATENT DOCUMENTS

CN    1646449    7/2005
(Continued)

OTHER PUBLICATIONS

Chinese Office Action for CN 200780004905.4, dated Dec. 25, 2009.
(Continued)

*Primary Examiner* — Duane Smith
*Assistant Examiner* — Christopher P Jones
(74) *Attorney, Agent, or Firm* — Finnegan, Henderson, Farabow, Garrett & Dunner, LLP

(57) ABSTRACT

An oxidizing gas purification apparatus (1) for a fuel cell (7) has a compressor (2) that compresses oxidizing gas and sends the oxidizing gas; a cooling apparatus (4), disposed downstream from the compressor (2), that cools the oxidizing gas passing therethrough; an adsorbent unit (5b), disposed downstream from the cooling apparatus (4), that houses an adsorbent (5a) that adsorbs impurities included in the oxidizing gas sent from the cooling apparatus (4) at a prescribed adsorption temperature and releases the adsorbed impurities at a prescribed thermal regeneration temperature that is above the prescribed adsorption temperature by control of the operation of the cooling apparatus (4) to cool the oxidizing gas that has a temperature above the prescribed adsorption temperature and that is sent from the compressor (2).

15 Claims, 7 Drawing Sheets

U.S. PATENT DOCUMENTS

| | | | |
|---|---|---|---|
| 7,547,431 B2 * | 6/2009 | Yadav et al. | 423/592.1 |
| 2002/0142201 A1 * | 10/2002 | Nelson | 429/26 |
| 2003/0157390 A1 * | 8/2003 | Keefer et al. | 429/34 |
| 2003/0170527 A1 | 9/2003 | Finn et al. | |
| 2004/0131911 A1 * | 7/2004 | Kaufmann et al. | 429/34 |
| 2005/0072298 A1 * | 4/2005 | Deane et al. | 95/96 |
| 2006/0035122 A1 | 2/2006 | Weissman et al. | |
| 2006/0083967 A1 * | 4/2006 | Sakai | 429/24 |
| 2006/0257708 A1 * | 11/2006 | Keefer et al. | 429/34 |
| 2008/0226957 A1 * | 9/2008 | Suematsu et al. | 429/22 |

FOREIGN PATENT DOCUMENTS

| | | |
|---|---|---|
| DE | 100 13 602 | 9/2001 |
| EP | 1 469 544 | 10/2004 |
| JP | 2003-132928 | 5/2003 |
| JP | 2003-317783 | 11/2003 |
| JP | 2004-55260 | 2/2004 |
| JP | 2004-327429 | 11/2004 |
| JP | 2005-71764 | 3/2005 |
| JP | 2005-129494 | 5/2005 |
| JP | 2005-203264 | 7/2005 |
| JP | 2005-310614 | 11/2005 |
| JP | 2005-322506 | 11/2005 |
| WO | WO 2004036675 A2 * | 4/2004 |
| WO | WO 2004/042857 | 5/2004 |
| WO | WO 2007/049691 | 3/2007 |

OTHER PUBLICATIONS

International Search Report, Aug. 13, 2007.
Written Opinion of the ISR, Aug. 13, 2007.
Office Action from the German Patent Office for DE Appl. No. 11 2007 000 346.4 dated May 8, 2012.

* cited by examiner

APPARATUS AND METHOD FOR PURIFYING OXIDIZING GAS IN A FUEL CELL

This Application is a national stage filing under 35 U.S.C. §371 of PCT/IB2007/000497, filed Mar. 1, 2007, and claims priority of Japanese Patent Application No. 2006-062517, filed Mar. 8, 2006.

BACKGROUND OF THE INVENTION

1. Field of the Invention

The present invention relates to an apparatus and method for purifying the oxidizing gas in a fuel cell that is used to generate electricity.

2. Description of the Related Art

A fuel cell generates electricity by causing an electrochemical reaction between a fuel gas and an oxidizing gas. Hydrogen is generally used as the fuel gas and air is generally used as the oxidizing gas. A noble metal such as platinum is generally used as the catalyst to cause an electrochemical reaction between the fuel gas and the oxidizing gas.

The air used as the oxidizing gas sometimes contains gas components (impurities) such as sulfur compounds and nitrogen oxides. When a catalyst made of platinum or other noble metal comes into contact with the impurities, its activity is reduced. If air used as the oxidizing gas is sent to the fuel cell without removing such impurities, the activity of the catalyst is reduced, which weakens the electrochemical reaction to cause a decrease in generated voltage. For this reason, an adsorbent (chemical filter) is provided in a fuel cell system for the purpose of removing impurities from the air. A carbon-based activated fiber or the like is generally used as the adsorbent, which adsorbs gas components such as sulfur compounds or nitrogen oxides. The adsorbent also releases the adsorbed gas components when heated to at least a certain temperature. Thus, by heating the adsorbent before it reaches the saturation adsorption amount, it is possible to maintain the adsorption capacity over a long period of time.

In conventional fuel cell systems, an electrical heater was provided for the thermal regeneration of the adsorbent, as described in, for example, Japanese Patent Application Publication No. JP-A-2005-129494 and Japanese Patent Application Publication No. JP-A-2004-327429.

When a fuel cell is installed on board a vehicle, however, there is limited space for installation, so that it is desirable to have a fuel cell system that uses fewer parts.

SUMMARY OF THE INVENTION

Given the foregoing problem, the present invention provides an apparatus and method capable of performing proper thermal regeneration of an adsorbent while reducing the number of parts in a fuel cell system.

In an aspect of the present invention, in order to solve the above-noted problem, an adsorbent within an adsorbent unit is thermally regenerated by controlling a cooling apparatus that cools the oxidizing gas sent from a compressor to the adsorbent unit. By doing this, because the operation of the cooling apparatus may be controlled to increase the temperature of the adsorbent to a prescribed thermal regeneration temperature, it is possible to perform proper thermal regeneration of the adsorbent while reducing the number of parts.

More specifically, according to the aspect of the present invention, an oxidizing gas purification apparatus for a fuel cell has a compressor, disposed in the oxidizing gas supply path to the fuel cell, that compresses oxidizing gas and sends the oxidizing gas; a cooling apparatus, disposed in the supply path downstream from the compressor, that cools the oxidizing gas passing through the cooling apparatus; an adsorbent unit, disposed in the supply path downstream from the cooling apparatus, that houses an adsorbent that adsorbs impurities included in the oxidizing gas sent from the cooling apparatus at the prescribed adsorption temperature and releases the adsorbed impurities at a prescribed thermal regeneration temperature above the adsorption temperature; and a controller that controls the operation of the cooling apparatus to cool the oxidizing gas that has a temperature above the prescribed adsorption temperature and that is sent from the compressor, so that the adsorbent is brought to the prescribed adsorption temperature for adsorption operation when the fuel cell operates, and so that the adsorbent is brought to the prescribed thermal regeneration temperature for thermal regeneration operation when the adsorbent is thermally regenerated.

In the oxidizing gas purification apparatus of the foregoing aspect, a compressor is provided in the oxidizing gas supply path. A cooling apparatus that cools the oxidizing gas is disposed downstream from the compressor. An adsorbent unit that houses an adsorbent that adsorbs and releases impurities from the oxidizing gas is disposed downstream from the cooling apparatus. A controller is configured to control the operation of the cooling apparatus. It is therefore possible for the controller to control the temperature of the oxidizing gas that will be sent to the adsorbent unit. As a result, it is possible to adjust the temperature of the adsorbent to an appropriate temperature.

Impurities are adsorbed by the adsorbent when the adsorbent reaches a prescribed adsorption temperature and released by the adsorbent when the adsorbent reaches a prescribed thermal regeneration temperature. Therefore, even if the adsorbent loses its adsorption capacity by exceeding the saturation adsorption amount, it is possible to restore the adsorption capacity of the adsorbent by heating the adsorbent to the prescribed thermal regeneration temperature. The adsorption temperature is the temperature of the adsorbent at which the adsorbent adsorbs impurities, and the thermal regeneration temperature is the temperature of the adsorbent at which the adsorbent releases the adsorbed impurities.

In the oxidizing gas purification apparatus for a fuel cell according to this aspect, when the fuel cell operates, the cooling operation of the cooling apparatus is controlled so that the adsorbent is at a prescribed adsorption temperature. As a result, the impurities in the oxidizing gas are adsorbed by the adsorbent, and the oxidizing gas from which impurities have been removed is sent to the fuel cell. When the fuel cell is stopped, the oxidizing gas purification apparatus performs thermal regeneration operation in which the operation of the cooling apparatus is controlled so that the adsorbent is at the prescribed thermal regeneration temperature. As a result, the impurities that had been adsorbed are released, and the adsorption capacity of the adsorbent is restored. The adsorption operation indicates one ventilation condition for the adsorbent unit, in which, for example, impurities are removed from oxidizing gas to be sent to the fuel cell and the oxidizing gas from which impurities have been removed is sent to the fuel cell. In the same manner, the thermal regeneration operation indicates one ventilation condition for the adsorbent unit, in which, for example, impurities that have been adsorbed in the adsorbent unit are released and exhausted.

From the above, the oxidizing gas purification apparatus for a fuel cell of this aspect performs proper thermal regeneration of the adsorbent while reducing the number of parts in the fuel cell system.

In the foregoing aspect of an oxidizing gas purification apparatus for a fuel cell, the compressor may send oxidizing gas having a temperature that is above the adsorption temperature during both adsorption operation and thermal regeneration operation, and the cooling apparatus cools the oxidizing gas to a greater degree during adsorption operation than during thermal regeneration operation.

That is, the temperature of the oxidizing gas sent downstream from the compressor is made at least higher than the prescribed adsorption temperature, and the controller controls the cooling apparatus so that oxidizing gas is cooled to a lesser degree during thermal regeneration operation than during adsorption operation. By doing this, the adsorbent reaches the prescribed thermal regeneration temperature that is suitable for the release of impurities. For example, the compressor is made so that it is capable of compressing the oxidizing gas to have the prescribed thermal regeneration temperature. By doing this, oxidizing gas that has reached the prescribed thermal regeneration temperature is sent downstream from the compressor, so that by reducing the amount of cooling by the cooling apparatus, it is possible to make the adsorbent the prescribed thermal regeneration temperature.

In the oxidizing gas purification apparatus for a fuel cell of the foregoing aspect, the cooling apparatus may include a flow passage in which coolant for cooling the fuel cell flows. The oxidizing gas is cooled by heat exchange between the coolant flowing in the flow passage and the oxidizing gas passing through the cooling apparatus, and the controller controls the flow amount of coolant so that less coolant is flowing in the flow passage during thermal regeneration operation than during adsorption operation.

That is, by cooling by heat exchange between oxidizing gas passing through the cooling apparatus and the coolant flowing in the flow passage, the amount of coolant flow is adjusted to control the amount of cooling. By doing this, oxidizing gas sent from the compressor, after being cooled by heat exchange with the coolant, is sent to the adsorbent unit. Therefore, by having the controller control the amount of coolant flow, the temperature of the adsorbent may be controlled to a temperature that is suitable for adsorption of impurities, and, when appropriate, to control the temperature to the thermal regeneration temperature to release the prescribed adsorbed impurities.

In the oxidizing gas purification apparatus for a fuel cell of the foregoing aspect, the controller may further control the discharge pressure of the compressor so that the discharge pressure during thermal regeneration operation is higher than during adsorption operation.

In addition, by making the pressure raising capability of the compressor variable, the temperature of the oxidizing gas may be adjusted by the discharge pressure of the compressor. By doing this, oxidizing gas that has been adjusted to an appropriate temperature by the discharge pressure of the compressor is sent downstream from the compressor. By controlling the compressor with the controller, therefore, it is possible to control the temperature of the adsorbent to the appropriate temperature for adsorbing impurities, and to control the temperature of the adsorbent to be a prescribed thermal regeneration temperature suitable for release of impurities.

In the oxidizing gas purification apparatus for a fuel cell of the foregoing aspect, the controller may cause the cooling apparatus to perform cooling regeneration operation that brings the adsorbent to the prescribed adsorption temperature once again after the thermal regeneration operation.

That is, by thermal regeneration-operation, oxidizing gas at a high temperature that has stagnated within the adsorbent unit is exhausted, and the adsorbent is brought to the prescribed adsorption temperature. After the end of thermal regeneration operation the controller controls the cooling apparatus so as to increase the amount of cooling and cool the adsorbent to the prescribed adsorption temperature. By doing this, because the adsorbent is brought to the prescribed adsorption temperature before transitioning to the adsorption operation, when transition is made to adsorption operation, impurities in the oxidizing gas are more reliably adsorbed by the adsorbent. The cooling regeneration operation is one ventilation condition for the adsorbent unit, in which operation condition, for example, residual heat of the adsorbent is removed.

The oxidizing gas purification apparatus for a fuel cell of the foregoing aspect may further have a branched path that is branched from the supply path between the adsorbent unit and the fuel cell, and a guide mechanism that directs oxidizing gas sent from the compressor to one of the fuel cell side and the branched path side, wherein the controller controls the guide mechanism so that oxidizing gas from the adsorbent unit is directed to the fuel cell side during adsorption operation and so that the oxidizing gas from the adsorbent unit is directed to the branched path side during thermal regeneration operation.

That is, the controller controls the guide mechanism so that impurities released by the heating of the adsorbent unit and high-temperature oxidizing gas that has stagnated in the adsorbent unit do not flow into the fuel cell. At the time of adsorption operation, the controller performs control to close the branched path during adsorption operation and performs control to close the fuel cell side path during thermal regeneration operation. By doing this, oxidizing gas from which impurities have been removed is sent to the fuel cell, and impurities released from the adsorbent are exhausted to outside the system.

The oxidizing gas purification apparatus for a fuel cell of the foregoing aspect may further have a pressure maintaining mechanism disposed in the branched path, which maintains a prescribed pressure within the adsorbent unit when oxidizing gas is directed to the branched path by the guide mechanism.

That is, by maintaining the increased pressure of oxidizing gas up until the adsorbent unit, the temperature of oxidizing gas in the adsorbent unit is maintained at a temperature above the prescribed adsorption temperature. For example, an orifice may be provided midway in the branched path, so that oxidizing gas within the adsorbent unit is brought to the prescribed thermal regeneration temperature during thermal regeneration operation. By doing this, oxidizing gas that reached the prescribed thermal regeneration temperature by the increase in pressure by the compressor brings the adsorbent, housed in the adsorbent unit, to the prescribed adsorption temperature, so that it is possible to reliably perform thermal regeneration operation. The prescribed pressure may be the pressure within the adsorbent unit, for example, that is substantially the same as the discharge pressure of the compressor.

According to another aspect of the invention, heating may be accomplished by increasing the pressure of the oxidizing gas. For example, an oxidizing gas purification apparatus for a fuel cell has a compressor, disposed in an oxidizing gas supply path to the fuel cell, which compresses the oxidizing gas to have a prescribed thermal regeneration temperature, and an adsorbent unit, disposed downstream from the compressor, which houses an adsorbent that releases adsorbed impurities at the prescribed thermal regeneration temperature.

In the oxidizing gas purification apparatus of the foregoing aspect, the compressor may also increase the pressure of the oxidizing gas to raise the temperature of the oxidizing gas to the prescribed thermal regeneration temperature by compressing the oxidizing gas. It is, therefore, possible to send oxidizing gas pressurized by the compressor to the adsorbent unit, and to bring the adsorbent housed in the adsorbent unit to the prescribed thermal regeneration temperature. By doing this, it is possible to perform proper thermal regeneration of the adsorbent using fewer components.

The described aspects of the present invention enable proper thermal regeneration of the adsorbent while reducing the number of parts in the fuel cell system. The described aspects also allow the use of a smaller heater or the omission of a heater, which reduces the power consumed for regenerating the adsorbent.

BRIEF DESCRIPTION OF THE DRAWINGS

The foregoing and further objects, features, and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Example embodiments of the present invention are described below, with references made to FIG. 1 to FIG. 4. The embodiments shown below are only examples and are not intended to restrict the present invention.

Figure 1:
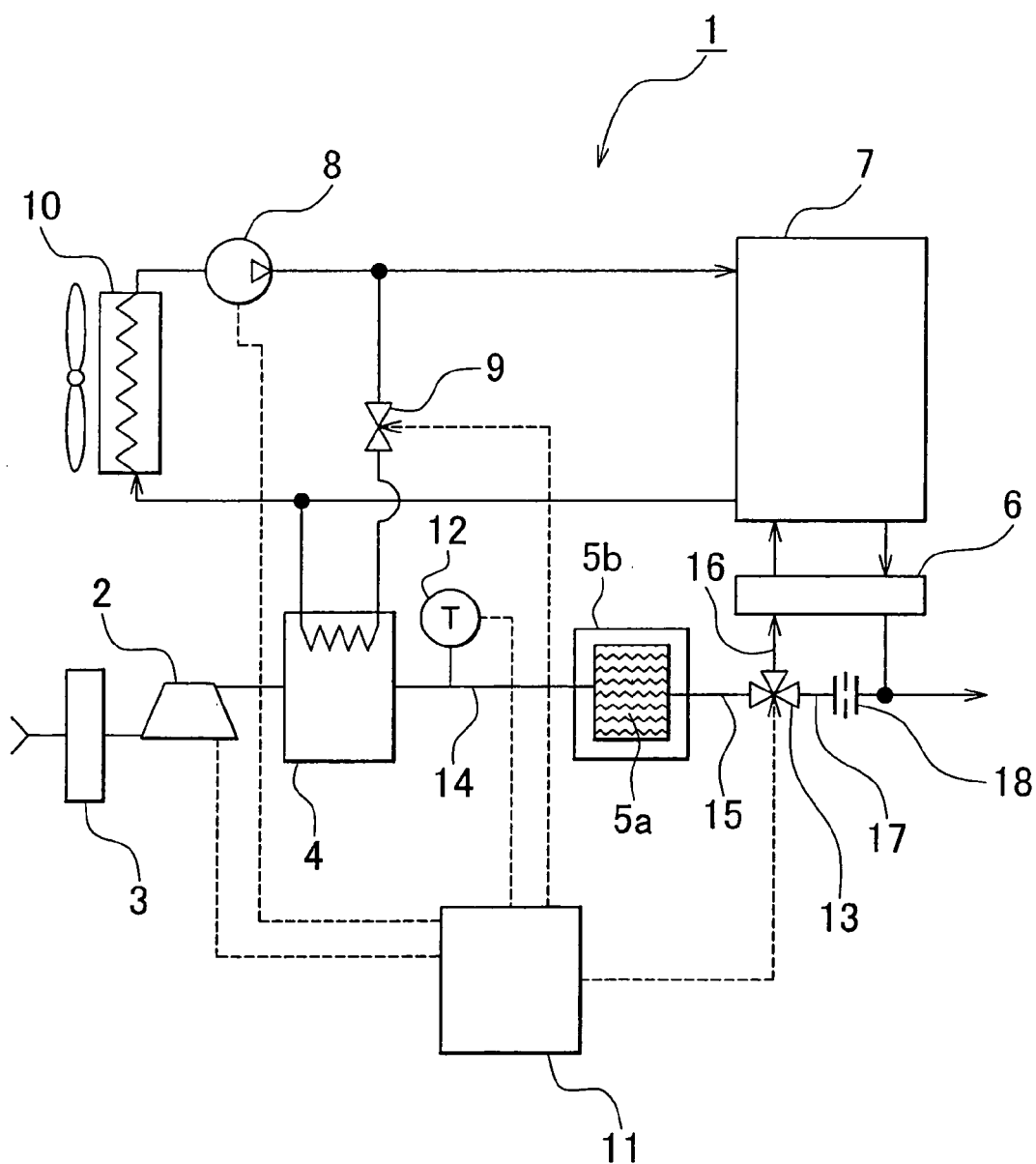
FIG. 1 is a simplified drawing of an oxidizing gas purification apparatus for a fuel cell system according to an embodiment of the present invention.

FIG. 1 is a simplified drawing of an oxidizing gas purification apparatus 1 for a fuel cell according to an embodiment of the present invention. The application of the constitution of this embodiment of the present invention is effective when the fuel cell system in which the oxidizing gas purification apparatus 1 is installed on board a vehicle that runs through an atmosphere having a relatively large amount of impurities. The oxidizing gas purification apparatus 1 according to this embodiment of the present invention may be applied, for example, to a solid polymer electrolyte membrane fuel cell (PEFC). The FC (fuel cell) stack 7 (corresponding to the fuel cell as discussed with regard to the present invention) is a PEFC, and obtains electrical energy by causing an electrochemical reaction between oxygen in the air and hydrogen.

In FIG. 1, an air cleaner 3 is provided at the air intake of the air compressor 2 (which functions as the compressor of the present invention) that sends air (which may be considered as the oxidizing gas of the present invention) to remove dust and the like from the air in the atmosphere. An intercooler 4 (which functions as the cooling apparatus constituent element of the present invention), an adsorbent unit 5b housing a chemical filter 5a (which functions as being the adsorbent of the present invention), and a humidifier 6 are provided midway in the piping (which may be regarded as the supply path of the present invention) that sends air from the air compressor 2 to the FC stack 7. The intercooler 4 is supplied with coolant for cooling the FC stack 7. The intercooler 4 is a heat exchanger that includes a pipe through which coolant flows (not illustrated; treatable as the flow passage in the present invention), with air flowing through the body side and coolant flowing through the pipe side, so that heat is exchanged. The coolant, by the action of a water pump 8, is sent from the water pump 8 to the intercooler 4 via coolant flow adjustment valve 9. Coolant that has been subjected to heat exchange in the intercooler 4, after being air cooled in the radiator 10, is sent once again to the water pump 8. That is, the cooling system (which can be treated as being the cooling apparatus of the present invention) forms a closed-loop water path.

The chemical filter 5a is an adsorbent that removes impurities from air that is sent to the FC stack 7. A filter made of carbon-based adsorbent, for example, can be used as the chemical filter 5a. In this embodiment, the carbon-based adsorbent is activated charcoal. Activated charcoal has a property such that when activated charcoal reaches the adsorption temperature and comes into contact with impurities such as sulfur compounds and nitrogen oxides, which lower the catalytic activity of the fuel cell, the impurities are adsorbed by the activated charcoal. The adsorption temperature is the temperature at which impurities in the air are adsorbed by the chemical filter 5a. While the adsorption temperature varies with the type of adsorbent, it is generally below 100° C. In the example shown in FIG. 1, from the standpoint of protecting the humidifier 6, and in consideration of the operating temperature of the fuel cell (for example, approximately 80° C. in the case of a PEFC), the temperature range −20 to +70° C. may be applied as the adsorption temperature. Another property of activated charcoal is that when the activated charcoal is heated to a thermal regeneration temperature, the adsorbed impurities are released. The temperature at which impurities adsorbed by the chemical filter 5a are released is referred to herein as the thermal regeneration temperature. The thermal regeneration temperature is higher than the adsorption temperature. For example, if the adsorption temperature is lower than 100° C., the thermal regeneration temperature would be at least 100° C. In the example shown in FIG. 1, with respect to an adsorption temperature of −20 to +70° C., the thermal regeneration temperature is in the range 110 to 180° C.

When the oxidizing gas purification apparatus 1 operates, the air compressor 2 sends compressed air constantly. The discharge pressure in this example is constant at all times. The air compressor 2 compresses room temperature air to increase the temperature of the air to the thermal regeneration temperature, and sends the compressed air to the intercooler 4. In this embodiment, air is compressed by the air compressor 2 to have a temperature equal to or higher than the thermal regeneration temperature, and the amount of cooling of the compressed air that has a temperature equal to or higher than the thermal regeneration temperature is adjusted at the intercooler 4 so as to have the adsorption temperature or the thermal regeneration temperature.

A temperature sensor 12 measures the temperature within the pipe 14 joining the intercooler 4 and the chemical filter 5a and transmits the temperature to an ECU 11 (electronic control unit, which functions as the controller of the present invention) is provided in the pipe 14. The temperature within the pipe 14 is substantially the same as in the chemical filter 5a, when air is being sent from the air compressor 2. If the temperature in the pipe 14 is the adsorption temperature, therefore, the chemical filter 5a adsorbs impurities in the air passing through the chemical filter 5a. In contrast, if the temperature within the pipe 14 is the thermal regeneration temperature, the chemical filter 5a will release the adsorbed impurities. The signal detected by the temperature sensor 12 (temperature within the pipe 14) is input to the ECU 11. Based on the signal detected by the temperature sensor 12, the ECU 11 controls the amount of cooling by the intercooler 4 by adjusting the opening of the coolant flow adjustment valve 9, so that the temperature within the pipe 14 is a pre-established temperature, for example the above-described adsorption temperature (−20 to +70° C.) or the thermal regeneration temperature (110 to 180° C.) depending on the operation condition.

A branched pipe 17 (which may be considered as the branched path in the present invention) is connected by a three-way valve 13, acting as a guide mechanism, to a pipe 15 that joins the chemical filter 5a and the humidifier 6. The three-way valve 13 diverts the air sent to the pipe 15 downstream from the chemical filter 5a between the pipe 16 (fuel cell side) connected to the FC stack 7 and the pipe 17 (branched path side). During adsorption operation, the pipe 15 downstream from the chemical filter 5a is connected to the fuel cell side and the branched path side is blocked, so that the flow of air to the downstream side is shut off. During thermal regeneration operation and during cooling regeneration operation, the pipe 15 downstream from the chemical filter 5a is connected to the branched path side that is open to the atmosphere, and the fuel cell side is blocked, so that the flow of air to that side is shut off. Adsorption operation is the condition in which impurities are adsorbed by the chemical filter 5a, for example, the condition in which the amount of cooling of the intercooler 4 is adjusted by control of the coolant flow adjustment valve 9, so that the temperature of the air sent from the air compressor 2 to the chemical filter 5a is brought to the adsorption temperature, and in which the three-way valve 13 is switched to the fuel cell side. Thermal regeneration operation is the condition in which impurities adsorbed by the chemical filter 5a are released, for example, the condition in which the amount of cooling of the intercooler 4 is adjusted by control of the coolant flow adjustment valve 9, so that the temperature of the air sent from the air compressor 2 to the chemical filter 5a is brought to the thermal regeneration temperature, and in which the three-way valve 13 is switched to the branched path side. Also, cooling regeneration operation is the condition in which residual heat in the chemical filter 5a is removed, for example, the condition in which the amount of cooling of the intercooler 4 is adjusted by control of the coolant flow adjustment valve 9, so that the temperature of the air sent from the air compressor 2 to the chemical filter 5a is brought to the adsorption temperature and in which the three-way valve 13 is switched to the branched path side.

An orifice 18 provided midway in the pipe 17 maintains the pressure of the pipe 14 from the air compressor 2 to the chemical filter 5a during thermal regeneration operation. The orifice 18 has a flow passage that maintains the pressure of the air that has reached the thermal regeneration temperature by the air compressor 2 up until the chemical filter 5a and discharges impurities released from the chemical filter 5a. By doing this, the pressure of air that has pressurized by the air compressor 2 is maintained until the chemical filter 5a. Stated differently, the temperature of air that has reached the thermal regeneration temperature by the action of the air compressor 2 is maintained until it reaches the chemical filter 5a.

The cooling system formed by the water pump 8, the coolant flow adjustment valve 9, the intercooler 4, and the radiator 10, via operational control of the water pump 8 by the ECU 11, can supply coolant to the intercooler 4 during operation of the oxidizing gas purification apparatus 1. When the opening of the coolant flow adjustment valve 9 is increased, the intercooler 4 increases the amount of cooling of the coolant, and when the opening of the coolant flow adjustment valve 9 is decreased, the intercooler 4 decreases the amount of cooling of the coolant. In this manner, by adjusting the opening of the coolant flow adjustment valve, it is possible to control the temperature of the air sent to the chemical filter 5a. The radiator 10 cools the coolant by air cooling.

The ECU 11 is formed by such elements as a CPU (central processing unit), a memory, and input/output interface (I/O). Electrical signals (detection signals) from the temperature sensor 12 and other non-illustrated sensors are input to the ECU 11. The ECU 11, in response to sensor detection signals, applies control signals to the coolant flow adjustment valve 9, the three-way valve 13, the air compressor 2, and the water pump 8, to control the operation thereof. The ECU 11, in response to the operating condition of the fuel cell system, controls the condition of the adsorption operation, the thermal regeneration operation, and the cooling regeneration operation of the oxidizing gas purification apparatus.

Figure 2A:
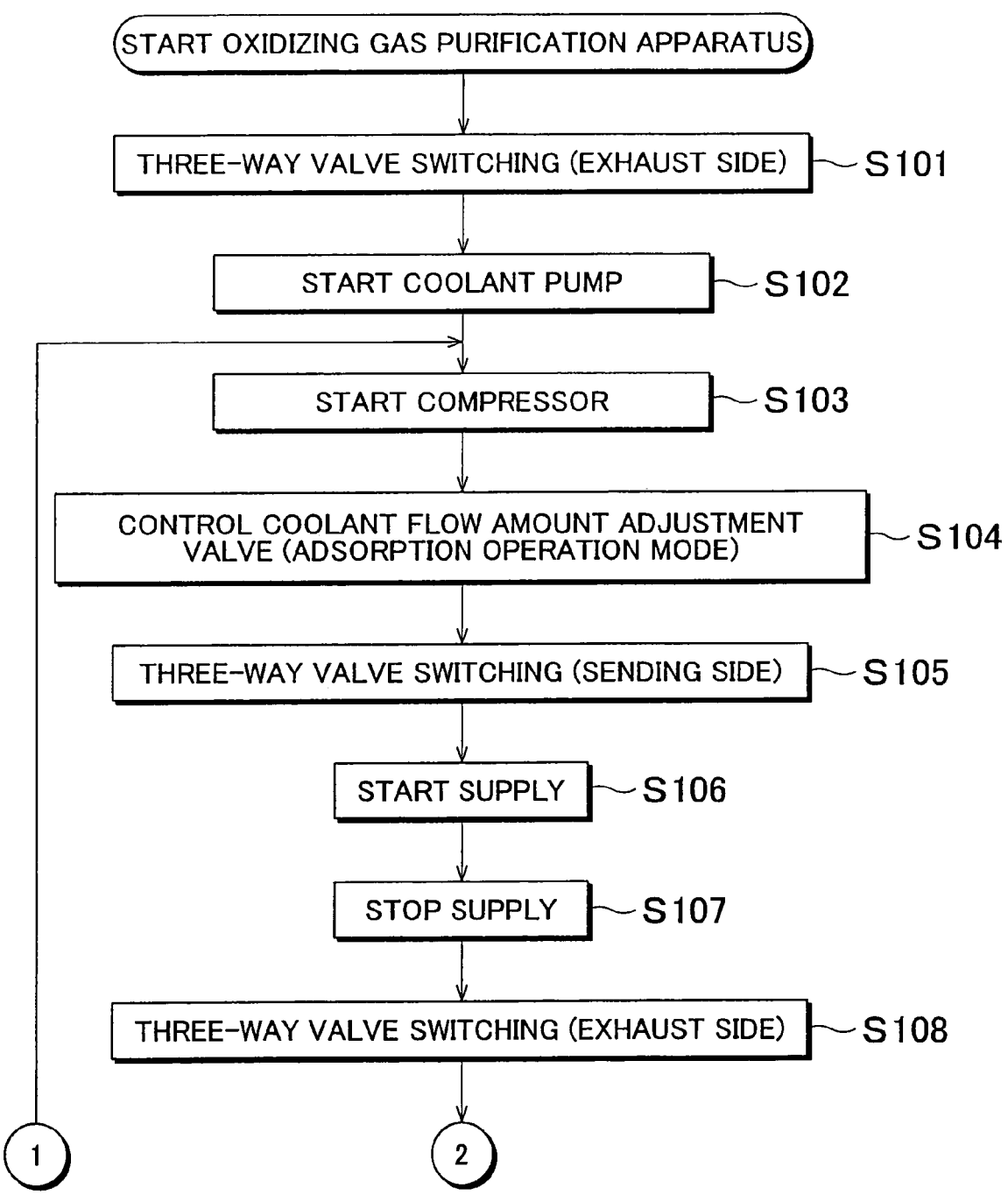
FIG. 2A and FIG. 2B are a flowchart showing operational control of the oxidizing gas purification apparatus according to an embodiment of the present invention.
Figure 2B:
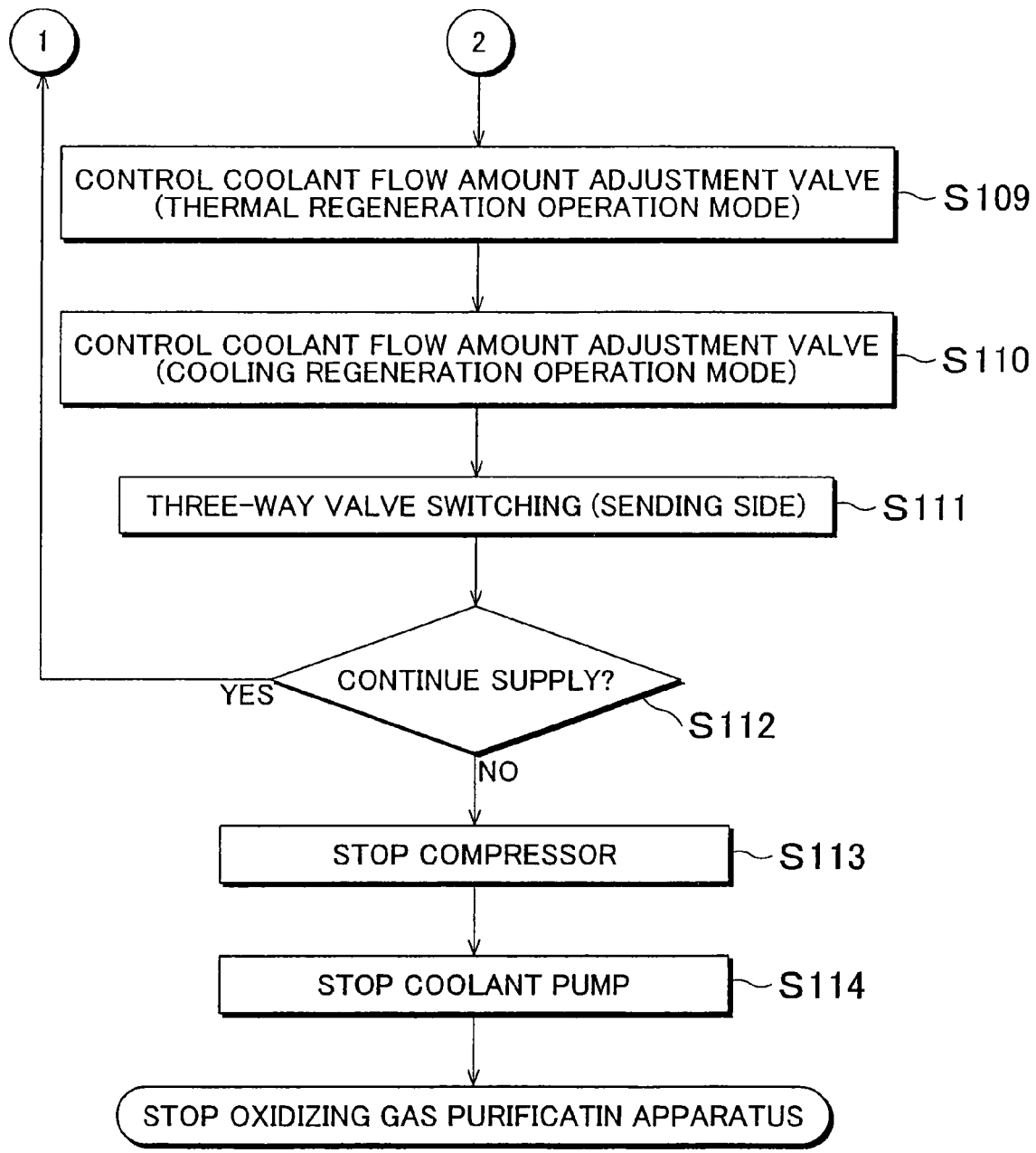

The operational control of the oxidizing gas purification apparatus 1 having the constitution described above is described below. The various forms of control described below are implemented by a CPU executing a program stored in memory in the ECU 11. FIG. 2A and FIG. 2B are a flowchart showing the operational control of the oxidizing gas purification apparatus 1.

When the fuel cell system is started up (when the fuel cell begins operating), in order to supply air to the FC stack 7, the ECU 11 starts up the oxidizing gas purification apparatus 1 as follows. The ECU 11 first switches the three-way valve 13 to the branched path side (S101) to shut off the fuel cell side. The ECU 11 next starts up the water pump 8 (S102) so that coolant is passed through the pipe side in the intercooler 4. Next, the ECU 11 starts the air compressor 2 (S103) so that air compressed, for example, until it reaches the thermal regeneration temperature, is sent to the chemical filter 5a via the body side of the intercooler 4. When the compressed air passes through the body side within the intercooler 4, it is cooled by heat exchange with the coolant flowing in the pipe side thereof. Next, the ECU 11 controls the opening of the coolant flow adjustment valve 9 so that the temperature measured by the temperature sensor 12 is in the prescribed adsorption temperature range (S104), for example from −20 to +70° C. By doing this, if the three-way valve 13 is switched to the fuel cell side (S105), the purified air is sent to the FC stack 7. Finally, the ECU 11 switches the three-way valve 13 to the fuel cell side so that the oxidizing gas purification apparatus 1 goes into the adsorption operation condition, and the supply to the FC stack 7 of air from which impurities have been removed is started (S106).

At a prescribed timing, such as when the vehicle on which the oxidizing gas purification apparatus 1 is installed stops or at the point at which a given amount of electricity has been generated (which can be recognized by the ECU 11 by the output of a non-illustrated speed meter or electrical power meter), the ECU 11 stops the supply of air to the FC stack 7 (S107) and switches the three-way valve 13 to the atmosphere side (S108), so as to perform thermal regeneration of the adsorbent. The ECU 11 next controls the opening of the coolant flow adjustment valve 9 so that the temperature measured by the temperature sensor 12 is in the prescribed thermal regeneration temperature range (S109), for example 110 to 180° C. That is, the valve opening is smaller than for adsorption operation, or may be completely closed. The result is that the cooling capacity of the intercooler 4 is reduced, and the oxidizing gas at the thermal regeneration temperature is sent from the intercooler 4. By doing this, the oxidizing gas purification apparatus 1 goes into the thermal regeneration operation condition. In the thermal regeneration operation condition, the chemical filter 5a is heated, and impurities adsorbed by the adsorbent are released. By releasing the impurities the adsorption capacity of the chemical filter 5a is restored. Also, the released impurities are exhausted into the air via the pipe 17.

After a prescribed period of time has elapsed from the transition to the above-described thermal regeneration operation condition, the ECU 11 controls the opening of the coolant flow adjustment valve 9 so that the temperature measured by the temperature sensor 12 returns to the prescribed adsorption temperature (S110). By doing this, the oxidizing gas purification apparatus 1 goes into the cooling regeneration operation condition. In the cooling regeneration operation condition, the chemical filter 5a is cooled. The prescribed period of time as used herein is a time that is pre-programmed by the ECU 11, for example, approximately several minutes in this embodiment. There is no restriction to this, however, as long as the time is sufficient for the adsorbed impurities to be sufficiently heated and the majority of the adsorbed impurities to be released. This prescribed period of time is determined depending on the compression capacity of the air compressor 2, and the surface area and the like of the chemical filter 5a.

After a prescribed period of time has elapsed after transitioning into the above-described cooling regeneration operation condition, the ECU 11 switches the three-way valve 13 to the fuel cell side (S111). By doing this, the oxidizing gas purification apparatus 1 goes into the adsorption operation condition once again, and the supply of purified air to the FC stack 7 is started once again. Additionally, the ECU 11 checks the operation condition of the vehicle on which the fuel cell system is installed and judges whether or not the supply of air to the FC stack 7 is to be continued (S112). In the case of continuing supply of air, the control of the coolant flow adjustment valve 9 is continued (S104). If, however, the supply of air is to be stopped, after stopping the air compressor 2 (S113) the water pump 8 is stopped (S114) and the operation of the oxidizing gas purification apparatus 1 is completed.

As described above, because in the oxidizing gas purification apparatus 1 according to the embodiment of the present invention the heating of the chemical filter 5a that had been done with an electrical heater in the past is replaced by the air compressor 2 for the adsorbent, it is possible to perform proper thermal regeneration of the adsorbent while reducing the number of parts in the fuel cell system. Additionally, by performing cooling regeneration operation after completion of thermal regeneration operation and before the start of adsorption operation, it is possible to prevent damage to the humidifier 6 and the FC stack 7.

Figure 3:
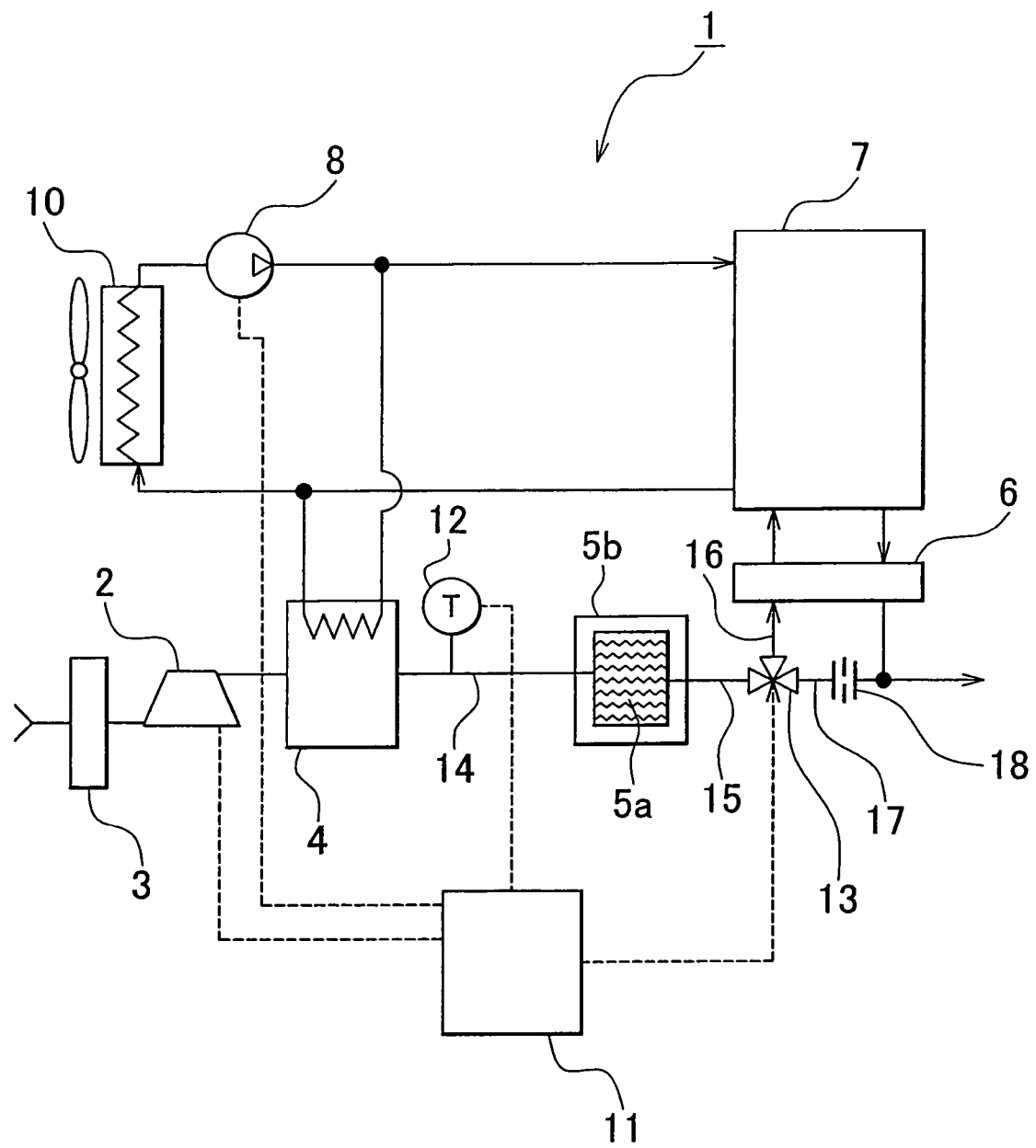
FIG. 3 is a simplified drawing of an oxidizing gas purification apparatus for a fuel cell system according to a variation of an embodiment of the present invention.

FIG. 3 shows oxidizing gas purification apparatus 1 according to a variation of an embodiment of the present invention. Whereas in the above-described embodiment the opening of the coolant flow adjustment valve 9 is adjusted to adjust the amount of cooling of the intercooler 4, in this variation the water pump 8 is made a variable speed pump, and rather than the ECU 11 controlling the opening of the coolant flow adjustment valve 9, the ECU 11 controls the rpm speed of the water pump 8 to adjust the amount of cooling of the intercooler 4. By doing this, it is not necessary to provide a coolant flow adjustment valve 9. Other elements of this variation of the embodiment are the same as the above-described embodiment.

Figure 4:
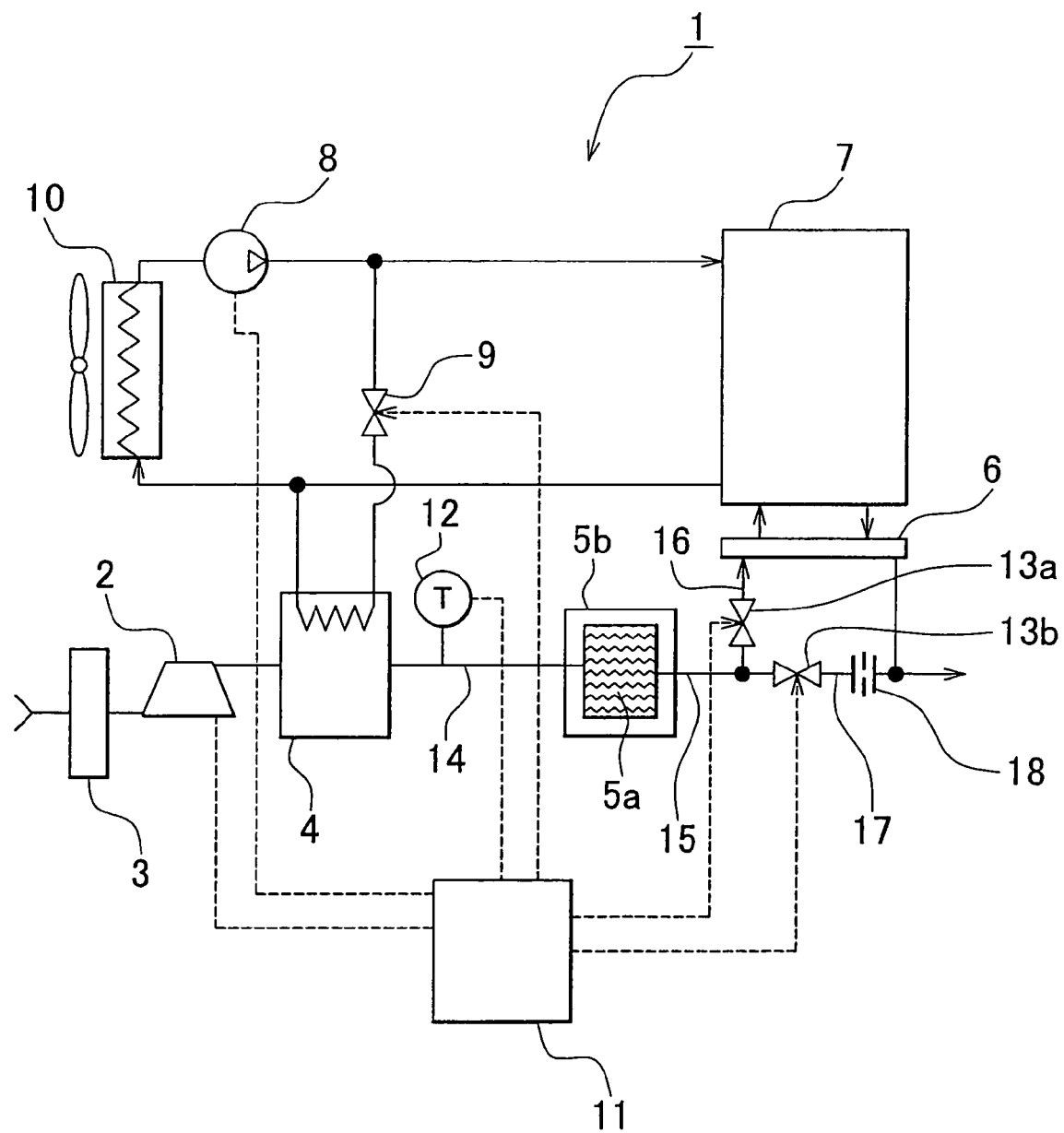
FIG. 4 is a simplified drawing of an oxidizing gas purification apparatus for a fuel cell system according to another variation of an embodiment of the present invention.

FIG. 4 shows an oxidizing gas purification apparatus according to another variation of the embodiment of the present invention. Whereas in the above-described embodiment the three-way valve 13 is used to switch the downstream side of the chemical filter 5a between the fuel cell side and the branched pipe side, in this variation a valve 13a is provided in the pipe 16 on the fuel cell side, and a valve 13b is provided in the pipe 17 on the branched path side. The ECU 11 controls the opening and closing operation of these valves to switch the downstream side of the chemical filter 5a between the fuel cell side and the branched path side. Specifically, when setting the pipe on the downstream side of the chemical filter 5a to the fuel cell side, the valve 13a is opened and the valve 13b is closed. In the case of setting the pipe on the downstream side of the chemical filter 5a to the branched path side, the valve 13b is opened and the valve 13a is closed. Other elements are the same as in the above-described embodiment.

Figure 5:
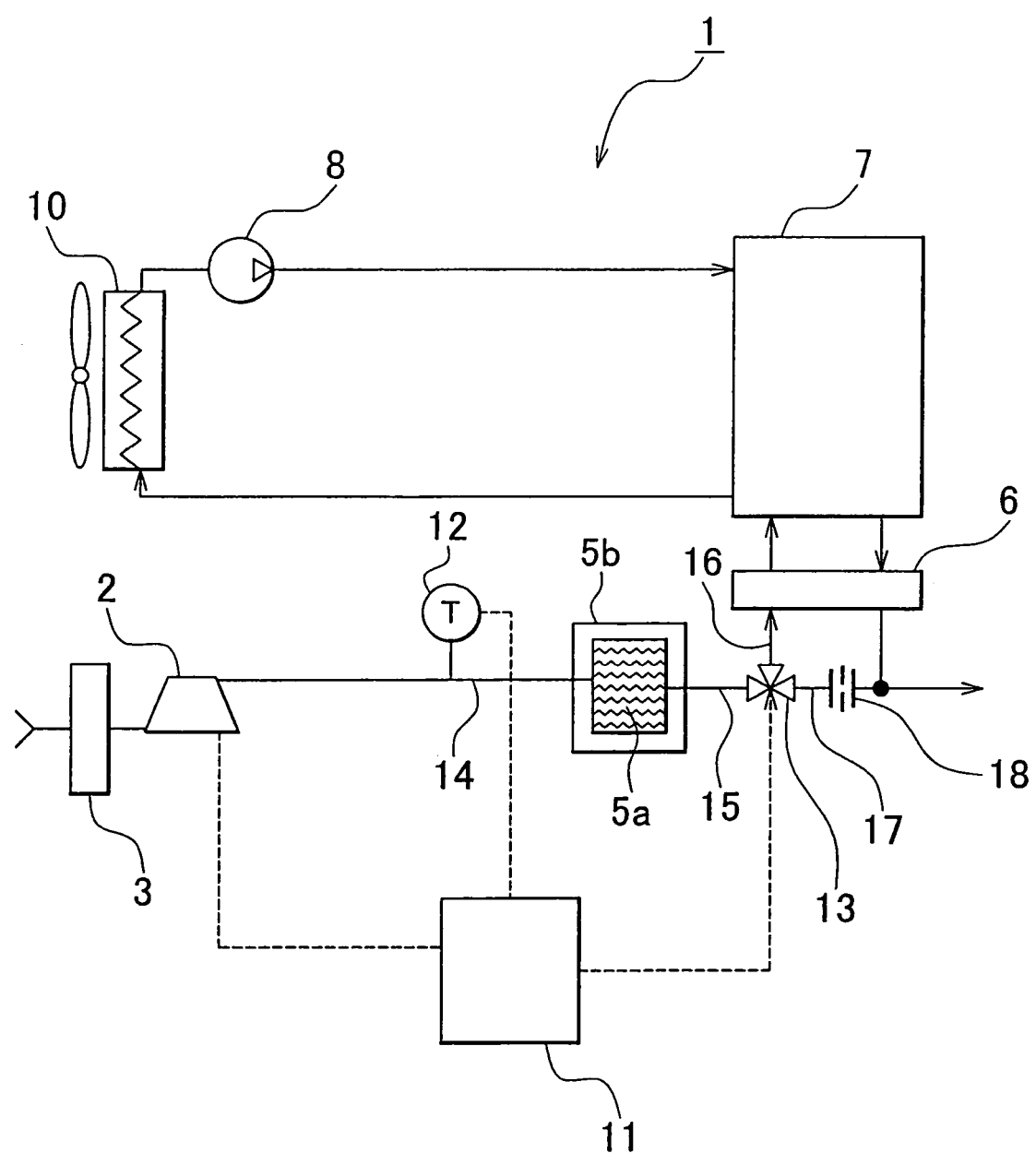
FIG. 5 is a simplified drawing of an oxidizing gas purification apparatus for a fuel cell system according to another embodiment of the present invention.
Figure 6:
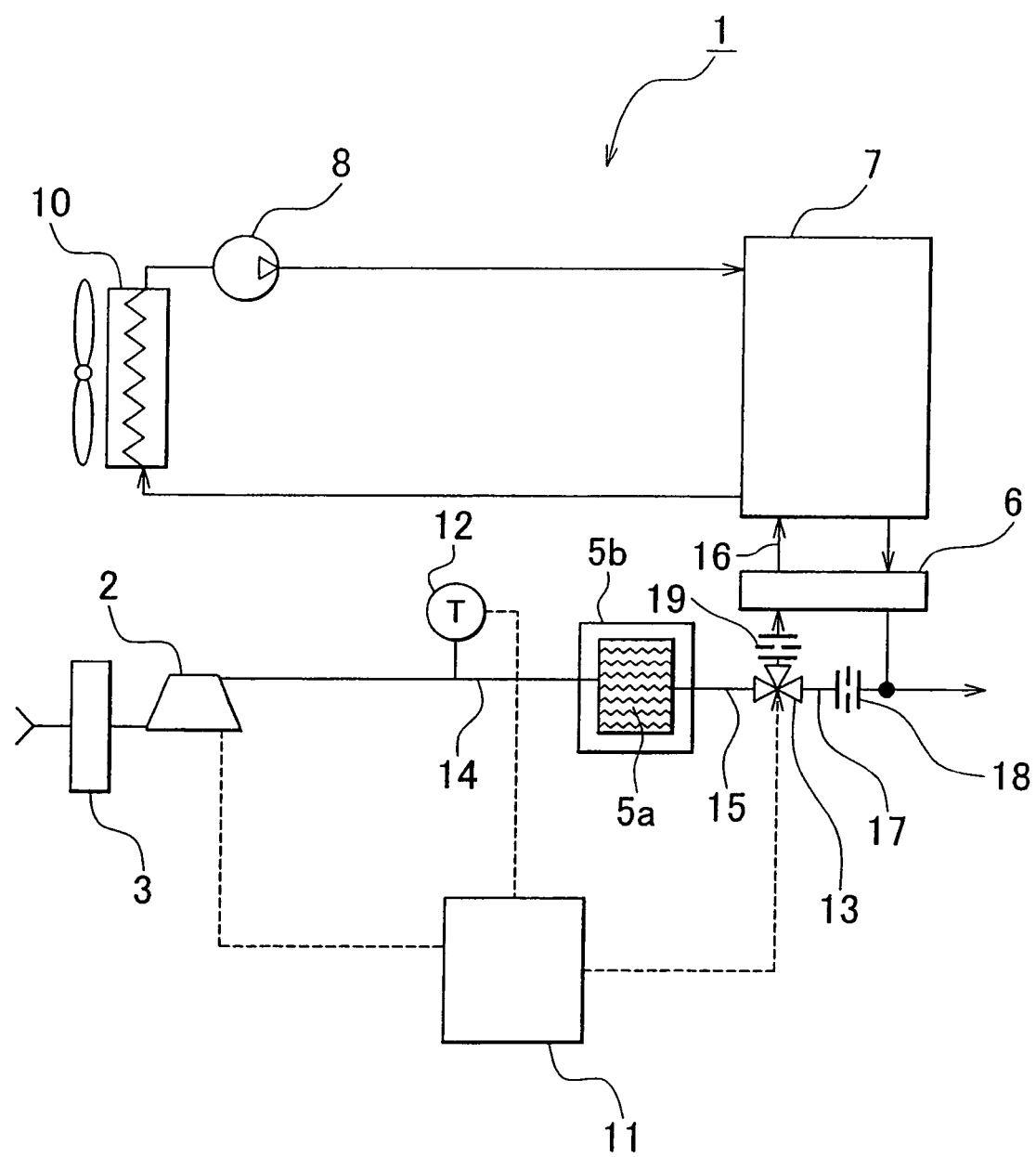
FIG. 6 is a simplified drawing of an oxidizing gas purification apparatus for a fuel cell system according to another embodiment of the present invention.

Whereas in the above-described embodiment the pressure raising capacity of the air compressor 2 is non-variable, it may alternatively be made variable. If this is done, because it is possible to increase and decrease the temperature of the air by just the ECU 11 controlling the air compressor 2, it is possible to eliminate the intercooler 4 and the coolant flow adjustment valve 9 as well, as shown in FIG. 5. Also, as shown in FIG. 6, by providing a first orifice 19 (which functions as the pressure reducing mechanism of the present invention) and a second orifice 18 (which functions as the pressure maintaining mechanism of the present invention), respectively, in the pipe 16 sending air to the FC stack 7 and the pipe 17 open to the atmosphere, when air that has been brought to the adsorption temperature by the air compressor 2 is sent to the FC stack 7, the pressure of the air may be reduced, and when opening to the atmosphere from the pipe 17, the pressure of the air may be maintained at the thermal regeneration temperature. By doing this, because the temperature of the air flowing in the chemical filter 5a may be adjusted by merely switching the three-way valve 13, even with a non-variable type air compressor 2, it is possible to eliminate the intercooler 4 and the coolant flow adjustment valve 9. Also, while in this embodiment the orifice 18 is provided on the downstream side of the chemical filter 5a, if the flow passage of pipe 17 is narrow and it is possible to sufficiently maintain the discharge pressure of the air compressor 2 up to the chemical filter 5a, it is not necessary to provide the orifice 18.

Thus, the embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. An oxidizing gas purification apparatus for a fuel cell comprising:
    a compressor, disposed in an oxidizing gas supply path to the fuel cell, that compresses oxidizing gas and sends the oxidizing gas;
    a cooling apparatus, disposed in the oxidizing gas supply path downstream from the compressor, that cools the oxidizing gas passing through the cooling apparatus;
    an adsorbent unit, disposed in the oxidizing gas supply path downstream from the cooling apparatus, that houses an adsorbent that adsorbs impurities included in the oxidizing gas sent from the cooling apparatus at a prescribed adsorption temperature and releases the adsorbed impurities at a prescribed thermal regeneration temperature above the prescribed adsorption temperature; and a controller that controls the operation of the cooling apparatus to cool the oxidizing gas that has a temperature above the prescribed adsorption temperature and that is sent from the compressor, so that the adsorbent is brought to the prescribed adsorption temperature for adsorption operation when the fuel cell operates, and so that the adsorbent is brought to the prescribed thermal regeneration temperature for thermal regeneration operation when the adsorbent is thermally regenerated;

wherein the compressor is configured to compress the oxidizing gas to a temperature that is substantially equal to or higher than the prescribed thermal regeneration temperature.

2. The oxidizing gas purification apparatus for a fuel cell according to claim 1, wherein the compressor sends oxidizing gas having the temperature above the prescribed adsorption temperature during both adsorption operation and thermal regeneration operation, and wherein the cooling apparatus cools the oxidizing gas during thermal regeneration operation to a lesser degree than during adsorption operation.

3. The oxidizing gas purification apparatus for a fuel cell according claim 1, wherein the cooling apparatus includes a flow passage in which coolant for the fuel cell flows, and the oxidizing gas is cooled via heat exchange between the coolant flowing in the flow passage and the oxidizing gas passing through the cooling apparatus, and the controller controls the flow amount of coolant so that the flow amount of coolant during thermal regeneration operation in the flow passage is less than the flow amount of coolant during adsorption operation.

4. The oxidizing gas purification apparatus for a fuel cell according to claim 3, wherein the cooling apparatus has a coolant flow adjustment valve in the flow passage, and wherein the controller controls the opening amount of the coolant flow adjustment valve to adjust the flow amount of the coolant in the flow passage.

5. The oxidizing gas purification apparatus for a fuel cell according to claim 4, wherein the oxidizing gas purification apparatus further comprises:
a temperature sensor disposed in the oxidizing gas supply path, downstream from the cooling apparatus and upstream from the adsorbent unit to detect temperature of the oxidizing gas, wherein the controller controls the opening of the coolant flow adjustment valve to adjust the temperature detected by the temperature sensor to a prescribed temperature.

6. The oxidizing gas purification apparatus for a fuel cell according to claim 3, wherein the cooling apparatus has a water pump, provided in the flow passage, and the controller controls the water pump to adjust the flow amount of coolant flowing in the flow passage.

7. The oxidizing gas purification apparatus for a fuel cell according to any claim 1, wherein the controller controls the discharge pressure of the compressor so that the discharge pressure during thermal regeneration operation is higher than during adsorption operation.

8. The oxidizing gas purification apparatus for a fuel cell according to any claim 1, wherein the controller controls the cooling apparatus to adjust temperature of the adsorbent to the prescribed adsorption temperature after completion of thermal regeneration operation.

9. The oxidizing gas purification apparatus for a fuel cell according to claim 1, wherein the oxidizing gas purification apparatus further comprises:

a branched path that is branched from the oxidizing gas supply path at a branched portion between the adsorbent unit and the fuel cell; and
a guide mechanism that directs oxidizing gas sent from the compressor to one of the fuel cell side and the branched path side,
wherein the controller controls the guide mechanism so that oxidizing gas from the adsorbent unit is sent to the fuel cell side during adsorption operation and sent to the branched path side during thermal regeneration operation.

10. The oxidizing gas purification apparatus for a fuel cell according to claim 9, wherein the guide mechanism is a three-way valve.

11. The oxidizing gas purification apparatus for a fuel cell according to claim 9, wherein the guide mechanism is formed by two valves, one which is disposed in the oxidizing gas supply path between the fuel cell and the branched portion to direct oxidizing gas sent from the adsorbent unit to the fuel cell side, and another which is disposed in the branched path to direct oxidizing gas sent from the adsorbent unit to the branched path side.

12. The oxidizing gas purification apparatus for a fuel cell according to claim 9, wherein the oxidizing gas purification apparatus further comprises a pressure maintaining mechanism disposed in the branched path maintains the pressure inside of the adsorbent unit at a prescribed pressure when oxidizing gas is directed by the guide mechanism to the branched path side.

13. The oxidizing gas purification apparatus for a fuel cell according to claim 1, wherein the controller starts thermal regeneration operation when a vehicle on which the fuel cell is installed is stopped or after a prescribed amount of electricity has been generated by the fuel cell.

14. An oxidizing gas purification apparatus for a fuel cell comprising:
a compressor, disposed in an oxidizing gas supply path to the fuel cell, the compressor being configured to compress the oxidizing gas to a temperature that is substantially equal to or higher than a prescribed thermal regeneration temperature; and
an adsorbent unit, disposed in the oxidizing gas supply path, downstream from the compressor, that houses an adsorbent that releases adsorbed impurities at the prescribed thermal regeneration temperature;
wherein the adsorbent adsorbs impurities included in the oxidizing gas sent from the compressor at a prescribed temperature and wherein the prescribed thermal regeneration temperature is higher than the prescribed adsorption temperature; and
wherein the oxidizing gas purification apparatus further comprises a controller that adjusts pressure generated by the compressor to vary the temperature of oxidizing gas sent from the compressor, so that the adsorbent is brought to the prescribed adsorption temperature for adsorption operation when the fuel cell operates, and so that the adsorbent is brought to the prescribed thermal regeneration temperature for thermal regeneration operation when the adsorbent is thermally regenerated.

15. The oxidizing gas purification apparatus for a fuel cell according to claim 14, wherein the oxidizing gas purification apparatus further comprises:
a branched path that is branched from the oxidizing gas supply path between the adsorbent unit and the fuel cell;
a guide mechanism that directs oxidizing gas sent from the compressor to one of the fuel cell side and the branched path side;

a pressure-reducing mechanism provided between the guide mechanism and the fuel cell, that reduces pressure within the adsorbent unit to a prescribed pressure so that the adsorbent is at a prescribed adsorption temperature; and a pressure maintaining mechanism disposed in the branched path, which maintains pressure within the adsorbent unit at a prescribed pressure so that the oxidizing gas is at the prescribed thermal regeneration temperature;

wherein the controller controls the operation of the guide mechanism so that oxidizing gas from the adsorbent unit is directed to the fuel cell side during adsorption operation and so that the oxidizing gas from the adsorbent unit is directed to the branched path side during thermal regeneration operation.

* * * * *